United States Patent [19]

Gentry et al.

[11] Patent Number: 4,848,647
[45] Date of Patent: Jul. 18, 1989

[54] ALUMINUM BASE COPPER-LITHIUM-MAGNESIUM WELDING ALLOY FOR WELDING ALUMINUM LITHIUM ALLOYS

[75] Inventors: Rebecca A. Gentry, Monroeville; Richard P. Martukanitz, Greensburg, both of Pa.

[73] Assignee: Aluminum Company of America, Pittsburgh, Pa.

[21] Appl. No.: 172,505

[22] Filed: Mar. 24, 1988

[51] Int. Cl.$^4$ ............... B23K 35/30; C22C 21/16
[52] U.S. Cl. .................. 228/263.17; 420/532; 420/533; 420/535
[58] Field of Search ............ 228/263.17; 420/529, 420/532, 533, 534, 535

[56] References Cited

U.S. PATENT DOCUMENTS 4,594,222  6/1986  Heck et al. ................ 420/529
4,626,409 12/1986  Miller ....................... 420/533
4,735,774  4/1988  Narayanan et al. .......... 420/534

FOREIGN PATENT DOCUMENTS 566674 11/1958 Canada .................. 420/535

OTHER PUBLICATIONS

"The Weldability of Al-5Mg-2Li-0.1Zr Alloy 01420" by J. R. Pickens, T. J. Langan and E. Barta.

Primary Examiner—Kenneth J. Ramsey
Attorney, Agent, or Firm—Andrew Alexander

[57] ABSTRACT

A welding alloy is disclosed for welding together an aluminum-lithium alloy to provide a weld characterized by insensitivity to weld cracking, good resistance to weld corrosion, and the ability to develop high weld strength during subsequent aging. The welding alloy consists essentially of an aluminum base alloy containing from about 4.5 to about 6.5 wt. % Cu, from about 0.2 to about 1.5 wt. % Mg, from about 0.8 to about 2.5 wt. % Li, and from about 0.07 to about 0.20 wt. % Ti; with the following maximum amounts of specific impurities: about 0.15 wt. % Si, about 0.30 wt. % Fe, about 0.3 wt. % Zn, and about 0.3 wt. % Mn; the balance consisting essentially of aluminum and not more than about 0.15 wt. % max. total of other impurities.

12 Claims, 1 Drawing Sheet

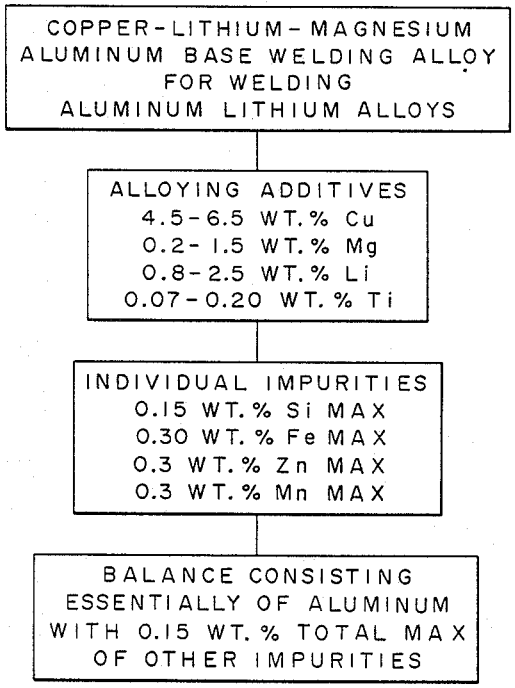

COPPER-LITHIUM-MAGNESIUM
ALUMINUM BASE WELDING ALLOY
FOR WELDING
ALUMINUM LITHIUM ALLOYS

ALLOYING ADDITIVES
4.5-6.5 WT.% Cu
0.2-1.5 WT.% Mg
0.8-2.5 WT.% Li
0.07-0.20 WT.% Ti

INDIVIDUAL IMPURITIES
0.15 WT.% Si MAX
0.30 WT.% Fe MAX
0.3 WT.% Zn MAX
0.3 WT.% Mn MAX

BALANCE CONSISTING
ESSENTIALLY OF ALUMINUM
WITH 0.15 WT.% TOTAL MAX
OF OTHER IMPURITIES

ALUMINUM BASE COPPER-LITHIUM-MAGNESIUM WELDING ALLOY FOR WELDING ALUMINUM LITHIUM ALLOYS

BACKGROUND OF THE INVENTION

1. Field of the Invention

This invention relates to a new aluminum base copper-lithium-magnesium alloy. More particularly, it relates to such an alloy for use in welding aluminum lithium alloy products together and which is characterized by improved resistance to weld cracking, high weld strength, and good corrosion resistance in the weld zone.

2. Description of the Related Art

Within the past few years development of aluminum lithium alloy products has received considerable attention for aerospace applications. Aluminum lithium alloy products have mechanical properties comparable to products made from typical aircraft alloys but with a 5-11% lower density. Use of such alloys, therefore, offers weight savings which can either reduce the cost of operating an aircraft or can permit an increase in the payload that the aircraft can carry. Aircraft are typically assembled with mechanical fasteners but with increased commercialization of aluminum lithium alloys for aircraft, such alloys will likely be considered for applications where joining by welding may be preferred. Such use may include, for example, cryogenic uses, marine hardware, lightweight pressure vessels, or as armor plate.

It is known that aluminum lithium alloys can be welded. A report dated November 1984 from Martin Marietta Laboratories entitled "The Weldability of Al-5Mg-2Li-0.1Zr alloy 01420" by J. R. Pickens, T. J. Langan, and E. Barta reports on work performed by Martin Marietta to assess weldability of lithium-containing aluminum alloys. The authors cited a number of Soviet publications concerned with aluminum lithium alloys and/or welding thereof. They reported that the most widely used aluminum lithium alloy in the world is Soviet developed alloy 01420. The nominal composition of this alloy was given as 5 wt. % Mg and 2 wt. % Li. Variants of the alloy may also contain either 0.05-0.3 wt. % Zr, 0.2-1.0 wt. % Mn, 0.05-0.3 wt. % Cr, 0.05-0.15 wt. % Ti, or 0.05-0.3 wt. % Cr+ <0.1 wt. % Ti for grain refinement.

The test work performed and reported in the Pickens et al publication was done on joining an 01420 alloy having 0.075 wt. % Zr as a grain refiner. Test welds were made using the TIG method of welding and using either 01420 parent metal as filler or Aluminum Association (AA) alloy 5356 having the composition 5 wt. % Mg, 0.4 wt. % Fe, 0.25 wt. % Si, 0.2 wt. % Mn, 0.2 wt. % Ti, 0.2 wt. % Cr, and 0.1 wt. % Zn with the balance consisting of aluminum. From tests performed, the authors concluded that the 01420 aluminum lithium alloy was weldable with weld characteristics varying with the filler alloy, preparation of the weld zone prior to welding, and thermal treatment of the weld zone after welding.

An aluminum lithium alloy developed in the United States and recently designated as Aluminum Association alloy 2090 is designed for high strength applications in the T8 temper. In addition to lithium, AA alloy 2090 is an aluminum base alloy which includes copper as a principal alloying element and has a nominal composition of 2.2 wt. % Li, 2.7 wt. % Cu, and 0.12 wt. % Zr. It is anticipated that in the United States the use of aluminum base copper-lithium alloys such as AA alloy 2090 will grow, and it would be desirable to provide a filler alloy for use in welding such alloys which will produce optimal joint characteristics.

Such optimal joint characteristics would include insensitivity to weld cracking, good resistance to weld corrosion, and the ability to develop high weld strength during subsequent aging.

SUMMARY OF THE INVENTION

It is, therefore, an object of this invention to provide a welding alloy for joining together aluminum lithium alloys to provide a weld characterized by insensitivity to weld cracking, good resistance to weld corrosion, and the ability to develop high weld strength during subsequent natural aging.

It is another object of this invention to provide a welding alloy for joining together aluminum lithium alloys which welding alloy comprises an aluminum base copper-lithium-magnesium alloy which is further characterized by a high level of copper to enhance resistance to weld cracking.

It is yet another object of this invention to provide a welding alloy for joining together aluminum lithium alloys which welding alloy comprises an aluminum base copper-lithium-magnesium alloy which is characterized by a high level of copper to enhance resistance to weld cracking and which is further provided with grain refining additions to provide a finer solidified grain structure and thereby further enhance resistance to weld cracking.

It is still another object of this invention to provide a welding alloy for joining together aluminum lithium alloys which welding alloy comprises an aluminum base copper-lithium-magnesium alloy which is characterized by a high level of copper to enhance resistance to weld cracking and which is further provided with grain refining additions of titanium to provide a finer solidified grain structure and thereby further enhance resistance to weld cracking.

It is a further object of this invention to provide a welding alloy for joining together aluminum lithium alloys characterized by additions of magnesium to increase the strength and weld metal hardness of the weld during subsequent aging.

In accordance with the invention a welding alloy for welding together aluminum lithium alloys consists essentially of an aluminum base alloy containing from about 4.5 to about 6.5 wt. % Cu, from about 0.2 to about 1.5 wt. % Mg, from about 0.8 to about 2.5 wt. % Li, and from about 0.07 to about 0.20 wt. % Ti; with the following maximum amounts of specific impurities: about 0.15 wt. % Si, about 0.30 wt. % Fe, about 0.3 wt. % Zn, about 0.3 wt. % Mn and about 0.15 wt. % Zr; the balance consisting essentially of aluminum and not more than about 0.15 wt. % max. total of other impurities.

BRIEF DESCRIPTION OF THE DRAWING

The sole drawing is a flow sheet illustrating the novel weld alloy of the invention.

DETAILED DESCRIPTION OF THE INVENTION

The provides an improved welding alloy for welding an aluminum lithium alloy to provide an improved insensitivity to weld cracking, good resistance to weld corrosion, and the ability to develop good weld strength during subsequent aging.

By the term "aluminum lithium alloy" is meant an aluminum base alloy which contains from at least about 0.5 to about 5.0 wt. % lithium, typically not greater than 3.0 wt. %, as an alloying additive.

By improved "insensitivity to weld cracking" is meant a weld which exhibits a crack length of less than 25 cm when subjected to an inverted tee weld test as described in *Welding Journal*, J. H. Dudas and F. R. Collins, Vol. 45, 1966, p. 240s.

By "high resistance to weld corrosion" is meant the absence of observable stress corrosion cracking failures after 2000 hours of alternate immersion in a 3.5 wt. % NaCl solution at 27° C. and evaluation with a bent-beam test in accordance with ASTM G44.

By "high weld strength" is meant a tensile strength of at least 242 MPa transverse to the axis of the weld and a yield strength of at least 207 MPa transverse to the axis of the weld after a 1.27 cm (0.500 inch) thick welded sample of 2090-T8E41 has been allowed to naturally age 30 days.

The novel welding alloy of the invention consists essentially of an aluminum base alloy containing from about 4.5 to about 6.5 wt. % Cu, from about 0.2 to about 1.5 wt. % Mg, from about 0.8 to about 2.5 wt. % Li, and from about 0.07 to about 0.20 wt. % Ti; with the following maximum amounts of specific impurities: about 0.15 wt. % Si, about 0.30 wt. % Fe, about 0.3 wt. % Zn, about 0.3 wt. % Mn and about 0.15 wt. % Zr; the balance consisting essentially of aluminum and not more than about 0.15 wt. % max. total of other impurities.

To provide the desired insensitivity to weld cracking the welding alloy of the invention must be provided with a high copper content. Thus, the preferred copper content is at least about 6.0 wt. % and the preferred range is from about 6.0 to about 6.5 wt. % copper.

The presence of the magnesium in the welding alloy of the invention is important to increase the strength of the weld and its natural aging tendency. While the magnesium content may range from about 0.2. to about 1.5 wt. %, the preferred range is from about 0.2 to about 0.7 wt. % magnesium.

The presence of titanium as a grain refining additive in the welding alloy of the invention is thought to improve the weld crack sensitivity of the welding alloy, i.e., make it less sensitive, by the formation of a finer solidified grain structure.

The presence of lithium in the welding alloy contributes to the light weight of the alloy as well as providing lithium in the weld area to enhance the compatibility of the weld metal with the aluminum-lithium alloy being joined by the weld.

Typically, weld alloy composition is about 5.6 wt. % Cu, about 0.9 wt. % Mg, about 2.0 wt. % Li, and about 0.12 wt. % Ti; and not more than: about 0.15 wt. % Si, about 0.30 wt. % Fe, about 0.3 wt. % Zn, and about 0.3 wt. % Mn; with the balance consisting essentially of aluminum and not more than about 0.15 wt. % max. total of other impurities.

Thus, the weld alloy of the invention provides an improved welding filler material suitable for joining together aluminum-lithium alloys. The resulting weld can provide improved insensitivity to weld cracking, good resistance to weld corrosion, and the ability to develop high weld strength during subsequent aging.

Having thus described the invention, what is claimed is:

1. A welding alloy for welding together an aluminum lithium alloy capable of forming a weld characterized by insensitivity to weld cracking, good resistance to weld corrosion, and the ability to develop high weld strength during subsequent aging and consisting essentially of an aluminum base alloy containing from about 4.5 to about 6.5 wt. % Cu, from about 0.2 to about 1.5 wt. % Mg, from about 0.8 to about 2.5 wt. % Li, and from about 0.07 to about 0.20 wt. % Ti; with the following maximum amounts of specific impurities: about 0.15 wt. % Si, about 0.30 wt. % Fe, about 0.3 wt. % Zn, about 0.3 wt. % Mn and 0.15 wt. % Zr; the balance consisting essentially of aluminum and not more than about 0.15 wt. % max. total of other impurities.

2. The welding alloy of claim 1 wherein the lithium content is at least about 1.0 wt. %.

3. The welding alloy of claim 1 wherein the lithium content ranges from about 1.0 to about 1.5 wt. %.

4. The welding alloy of claim 1 wherein the lithium content is at least about 1.2 wt. %.

5. The welding alloy of claim 1 wherein the magnesium content ranges from about 0.2 to about 0.7 wt. %.

6. The welding alloy of claim 1 wherein the magnesium content is at least about 0.3 wt. %.

7. The welding alloy of claim 1 wherein the copper content is at least about 6.0 wt. %.

8. A welding alloy for welding together an aluminum-lithium alloy capable of forming a weld characterized by insensitivity to weld cracking, good resistance to weld corrosion, and the ability to develop high weld strength during subsequent aging and consisting essentially of an aluminum base alloy containing from about 4.5 to about 6.5 wt. % Cu, from about 0.2 to about 0.7 wt. % Mg, from about 1.0 to about 1.5 wt. % Li, and from about 0.07 to about 0.20 wt. % Ti; with the following maximum amounts of specific impurities: about 0.15 wt. % Si, about 0.30 wt. % Fe, about 0.3 wt. % Zn, about 0.3 wt. % Mn and 0.15 wt. % Zr; the balance consisting essentially of aluminum and not more than about 0.15 wt. % max. total of other impurities.

9. The welding alloy of claim 8 wherein the lithium content is at least about 1.2 wt. %.

10. The welding alloy of claim 8 wherein the magnesium content is at least about 0.3 wt. %.

11. The welding alloy of claim 8 wherein the copper content is at least about 6.0 wt. %.

12. A welding alloy for welding together an aluminum lithium alloy capable of forming a weld characterized by insensitivity to weld cracking, good resistance to weld corrosion, and the ability to develop high weld strength during subsequent aging and consisting essentially of an aluminum base alloy containing from about 6.0 to about 6.5 wt. % Cu, from about 0.3 to about 0.7 wt. % Mg, from about 1.2 to about 1.5 wt. % Li, and from about 0.07 to about 0.20 wt. % Ti; with the following maximum amounts of specific impurities: about 0.15 wt. % Si, about 0.30 wt. % Fe, about 0.3 wt. % Zn, about 0.3 wt. % Mn and 0.15 wt. % Zr; the balance consisting essentially of aluminum and not more than about 0.15 wt. % max. total of other impurities.

* * * * *

Notice of Adverse Decisions in Interference

In Interference No. 102,523, involving Patent No. 4,848,647, R. A. Gentry, R. P. Martukanitz, ALUMINIUM BASE COPPER-LITHIUM-MAGNESIUM WELDING ALLOY FOR WELDING ALUMINIUM LITHIUM ALLOYS, final judgment adverse to the patentees was rendered June 22, 1992, as to claims 1-12.

*(Official Gazette August 25, 1992.)*